United States Patent
Lo

(10) Patent No.: US 7,657,733 B2
(45) Date of Patent: Feb. 2, 2010

(54) HARDWARE PASSWORD ACCESSING METHOD

(75) Inventor: Jeffrey Lo, Taipei (TW)

(73) Assignee: Inventec Corporation, Taipei (TW)

( * ) Notice: Subject to any disclaimer, the term of this patent is extended or adjusted under 35 U.S.C. 154(b) by 826 days.

(21) Appl. No.: 11/330,250

(22) Filed: Jan. 12, 2006

(65) Prior Publication Data

US 2007/0162970 A1    Jul. 12, 2007

(51) Int. Cl.
*G06F 9/00* (2006.01)
(52) U.S. Cl. .............................. 713/2; 726/16
(58) Field of Classification Search ............... 713/1, 713/2
See application file for complete search history.

(56) References Cited

U.S. PATENT DOCUMENTS

2004/0104709 A1* 6/2004 Yamaji et al. ............... 320/150

* cited by examiner

*Primary Examiner*—Kimyen Vu
*Assistant Examiner*—Yogesh Paliwal
(74) *Attorney, Agent, or Firm*—Bacon & Thomas, PLLC

(57) ABSTRACT

The present invention is to provide a hardware password accessing method, which is capable of reading a password of at least one hardware (such as a hard disk) disposed on a computer and storing the password to a RAM before the computer entering a standby mode from a working status and also capable of retrieving the password of the hardware from the RAM to restart the hardware once the computer being restored to the working status from the standby mode, so as to resolve the conventional problems caused by storing the hardware password to a CMOS.

2 Claims, 2 Drawing Sheets

HARDWARE PASSWORD ACCESSING
METHOD

BACKGROUND OF THE INVENTION

The present invention relates to an accessing method, and more particularly to a hardware password accessing method capable of reading a password of at least one hardware (such as a hard disk) disposed on a computer and storing the password to a RAM before the computer entering a standby mode from a working status, and capable of retrieving the password of the hardware from the RAM to restart the hardware once the computer being restored to the working status from the standby mode.

PRIOR ART OF THE INVENTION

Nowadays, the world has come to a new era with information flourishing development. The rapid advancement of various information related products developed from the calculating machines not only shorten the distance between people in time and space, but also closely connect with our daily lives. Along with the rapid changes of all kinds of information products, the relevant power control technology and power saving method thereof are also constantly being researched and developed. No doubt, computer facilities capable of providing people with more convenient, efficient and power saving omnibus services in the future will be an important index for evaluating whether the information technology of one country is superior to the other countries.

An operating system, Windows XP for example, developed by Microsoft Corporation supports power management technology of Advanced Configuration and Power Interface (ACPI) in computer industry. The power management technology of the ACPI permits the operating system to control the power of computer and peripheral. The functions of the power management in the operating system includes a hibernation mode and a standby mode, of which the operating processes and differences are interpreted as follows:

(A) Hibernation Mode: Before the computer is being shut down, the operating system will store the documents and files being opened and the working statuses of random memories and a central processing unit to a hard disk of the computer in an image compressed file, and the operating system will decompress the image compressed files to restore previously opened documents and applications to previous working status when the computer is powered on next time;

(B) Standby mode: The operating system will disconnect power supply from the computer to hardware elements, such as peripherals, screens and hard disks, to reduce power consumption of the computer, but the operating system will keep supplying power to random access memory (RAM) where the working statuses of the opened documents and applications are stored. Since the operating system doesn't need to decompress compressed image files and the working statuses of the opened documents and applications are still stored in the RAM, the standby mode can thus be restored to the previous working status faster than the hibernation mode.

In addition, if a system password has been set to the operating system by a user, in order to restore the hibernation mode or the standby mode back to its previous working status, the correct system password has to be inputted and the operating system will then be restored to its previous working status. A Basic Input/Output System (BIOS) is utilized by a CPU to open a computer system when the computer is powered on, and the BIOS manages data flow between a computer operating system (OS) and peripherals, such as a hard disk, a video receiver, a keyboard, a mouse and a printer, etc. If the BIOS is modified arbitrarily, it is possible to cause the computer unable to be normally powered on. In order to ensure that the computer is operated normally and to prevent other people from modifying the BIOS arbitrarily, the BIOS has a password setting function, wherein the password includes a power on password, a supervisor password and a hard disk password.

When the hard disk password has been set within the BIOS, every time when the power is being supplied to the hard disk, the hard disk password is required to be inputted to the hard disk again, the hard disk can then be used normally. As the foregoing mentioned, when the computer is in the standby mode, the power of the computer supplied to the hardware elements, such as the peripherals, the screen and the hard disk, will be disconnected. Once the computer is restored to previous working status from the standby mode, the hard disk password is required to be inputted again by the computer. Thus, in order to avoid the user from being requested to input the system password and the hard disk password every time when the computer is restored to previous working status from the standby mode, the hard disk password will be stored in a Complementary Metal-Oxide Semiconductor (CMOS) of the computer when the computer is powered on at the first time. So the computer can obtain the hard disk password from the CMOS automatically and write the same to the hard disk when the computer being restored to previous working status from the standby mode, the user needs not to input the hard disk password every time. However, it is possible to change the hard disk password when the computer is operated, so every time the computer is powered on, the hard disk password has to be written to the CMOS again.

However, since the storage space and read/write number of times for the CMOS are limited, the read/write number of times for the CMOS will be reduced rapidly if the hard disk password is required to be written to the CMOS every time when the computer is powered on, which doesn't comply with the benefit of using the CMOS. In addition, the method of accessing the CMOS is well known by those who skilled in the art, many documents relating to the methods of accessing the CMOS have been published even in the internet. Consequently, the data stored in the CMOS has risks of being stolen to obtain the hard disk password to be decrypted. Thus, how to not store the hard disk password in the CMOS, how to reduce the read/write number of times of the CMOS, and how to avoid the hard disk being stolen are the major solutions to be expected.

SUMMARY OF THE INVENTION

After considerable research and experimentation, a hardware password accessing method according to the present invention has been devised so as to overcome the above drawbacks of the prior art and bring contribution to people.

One object of the present invention is to provide a hardware password accessing method, which is able to read a password of at least one hardware (such as a hard disk) disposed on a computer and store the password to a RAM before the computer entering a standby mode from a working status. Once the computer is restored to the working status from the standby mode, the computer will retrieve the password of the hard disk from the RAM to restart the hardware, so as to resolve the conventional problems caused by storing the hardware password to a CMOS.

The above and other objects, features and advantages of the present invention will become apparent from the following detailed description taken with the accompanying drawings.

DETAILED DESCRIPTION OF THE PREFERRED EMBODIMENTS

Figure 1:
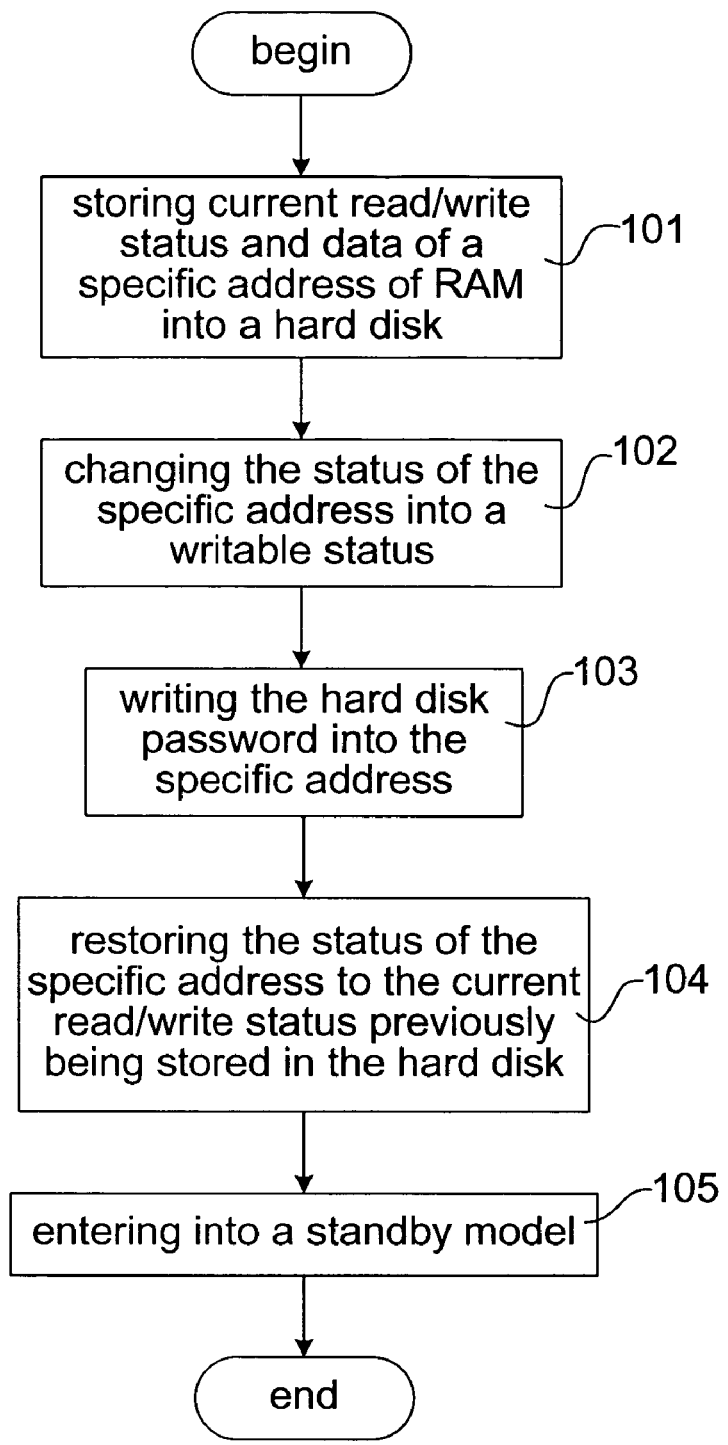
FIG. 1 is a flow chart of storing a password of a hard disk to a RAM according to the present invention.
Figure 2:
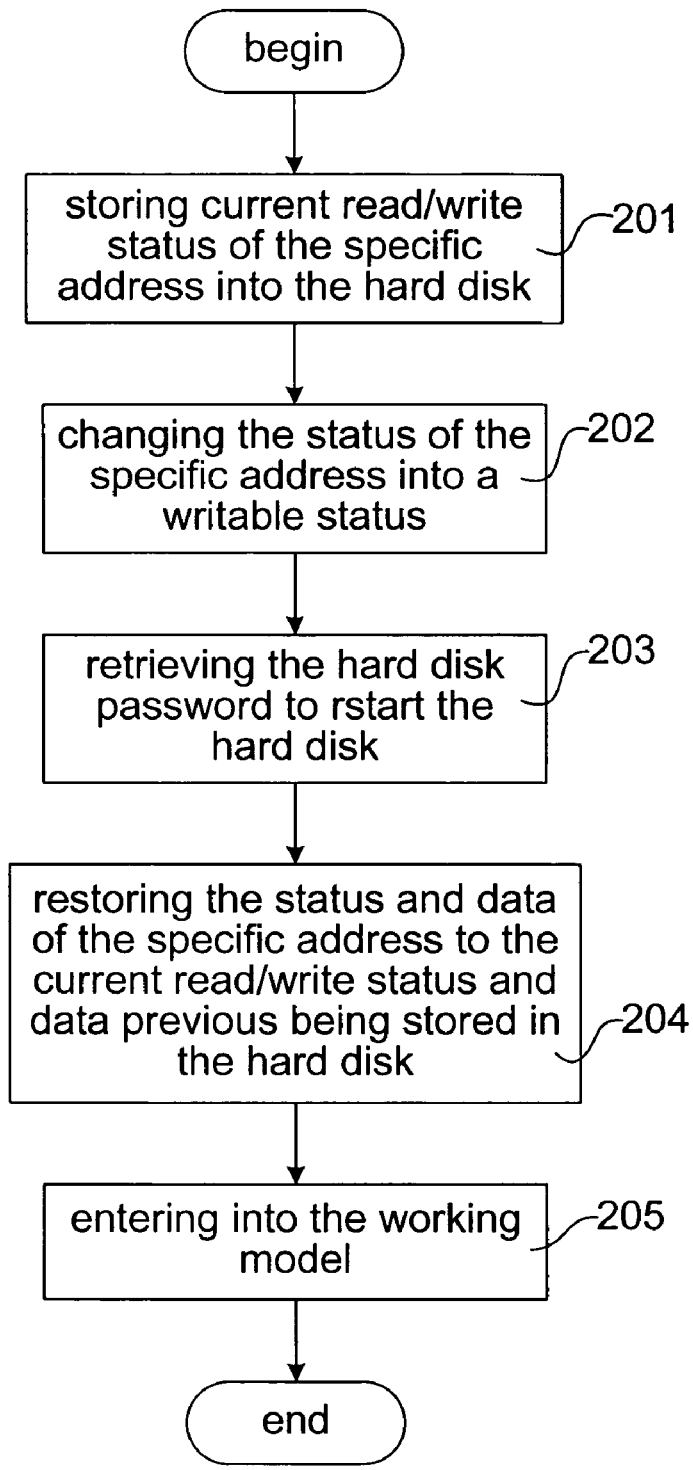
FIG. 2 is a flow chart of retrieving the password of the hard disk from the RAM according to the present invention.

The present invention relates to a hardware password accessing method implemented by installing a password accessing software in a computer, enabling the computer to read at least a password of at least one hardware (such as hard disk) installed in the computer and store the password in a RAM of the computer when the computer enters into a standby mode from a working status. The computer can retrieve the hardware password from the RAM before the computer is restored from the standby mode to the working status, so as to restart the hardware by using the hardware password. Thus, in comparing with the method of storing and retrieving hardware password in a CMOS used in the prior art, the method claimed in the present invention has the advantages as described below:

1. The storing volume of the RAM is larger than that of the CMOS, so the password stored in the RAM is not easy being stolen than that in the CMOS;
2. The read/write number of times for the RAM is much higher than that for the CMOS, so the us life of the RAM will be much longer than that of the CMOS;
3. The access speed of the RAM is faster than that of the CMOS, so the hardware will be restarted more quickly;
4. The RAM is replaceably plugged in a circuit board of the computer, it can easily be replaced by a user while in failure. However, since the CMOS is disposed on the circuit board by SMT (Surface Mounting Technique), it is far more difficult for a user to replace the CMOS than to replace a RAM by oneself.

In an embodiment of the present invention, the hardware can be a hard disk and the password can be a password designated to the hard disk. Before the computer enters into the standby mode from the working status, the computer proceeds with the following steps according to the password accessing software, so as to store the hard disk password in the RAM:

(101) first, storing current read/write status and data of a specific address of the RAM into the hard disk;

(102) then, changing the status of the specific address of the RAM into a writeable status;

(103) writing the hard disk password read from the hard disk into the specific address of the RAM;

(104) restoring the status of the specific address to the current read/write status previously being stored in the hard disk;

(105) entering into a standby mode from a working status.

In the embodiment, before the computer enters into the working status from the standby mode, the computer proceeds with the following steps according to the password accessing software, so as to retrieve the hard disk password from the RAM:

(201) First, storing the current read/write status of the specific address of the RAM into the hard disk;

(202) changing the status of the specific address of the RAM into a readable status;

(203) retrieving the hard disk password from the specific address of the RAM to restart the hard disk;

(204) restoring the status and data of the specific address of the RAM to the current read/write status and date previously being stored in the hard disk;

(205) entering into the working status from the standby mode.

From above-mentioned steps, the computer has to store the current read/write status and data of the specific address of the RAM into the hard disk before writing the hard disk password into the specific address of the RAM. The reason is that the RAM and ROM share the same address line. If the status of RAM and ROM is not properly restored to the previous current read/write status after the hard disk password being written into the specific address of the RAM, an error may be occurred to the operating system of the computer. Therefore, it is necessary to store the current read/write status and data of the specific address of the RAM into the hard disk in advance and then restore the status of the specific address of the RAM to the previous current read/write status after the hard disk password being written into the specific address of the RAM. Thus, the error of the operating system of the computer can be avoided, and the problems caused by the conventional method for storing the hard disk password to a Complementary Metal-Oxide Semiconductor (CMOS) can be resolved.

While the invention herein disclosed has been described by means of specific embodiments, numerous modifications and variations could be made thereto by those skilled in the art without departing from the scope and spirit of the invention set forth in the claims.

What is claimed is:

1. A hardware password accessing method implemented by installing a password accessing software in a computer, enabling the computer to read a password of a hard disk disposed on the computer and store the password in a RAM of the computer, which includes the steps of:

storing current read/write status and data of a specific address of the RAM into the hard disk;

changing the status of the specific address of the RAM into a writable status;

writing the password read from the hard disk into the specific address of the RAM;

restoring the status of the specific address of the RAM to the current read/write status previously being stored in the hard disk;

entering into a standby mode from a working status; and retrieving the password of the hard disk from the RAM to restart the hard disk before the computer enters into the working status from the standby mode.

2. The method of claim 1 further including the steps of:

storing the current read/write status of the specific address of the RAM into the hard disk;

changing the status of the specific address of the RAM into a readable status;

retrieving the password from the specific address of the RAM to restart the hard disk;

restoring the status and data of the specific address of the RAM to the current read/write status and data previously being stored in the hard disk; and entering into the working status from the standby mode.

* * * * *

UNITED STATES PATENT AND TRADEMARK OFFICE
CERTIFICATE OF CORRECTION

PATENT NO.       : 7,657,733 B2                                      Page 1 of 1
APPLICATION NO. : 11/330250
DATED            : February 2, 2010
INVENTOR(S)      : Jeffrey Lo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1058 days.

Signed and Sealed this

Twenty-eighth Day of December, 2010

David J. Kappos
*Director of the United States Patent and Trademark Office*